Patented Nov. 3, 1925.

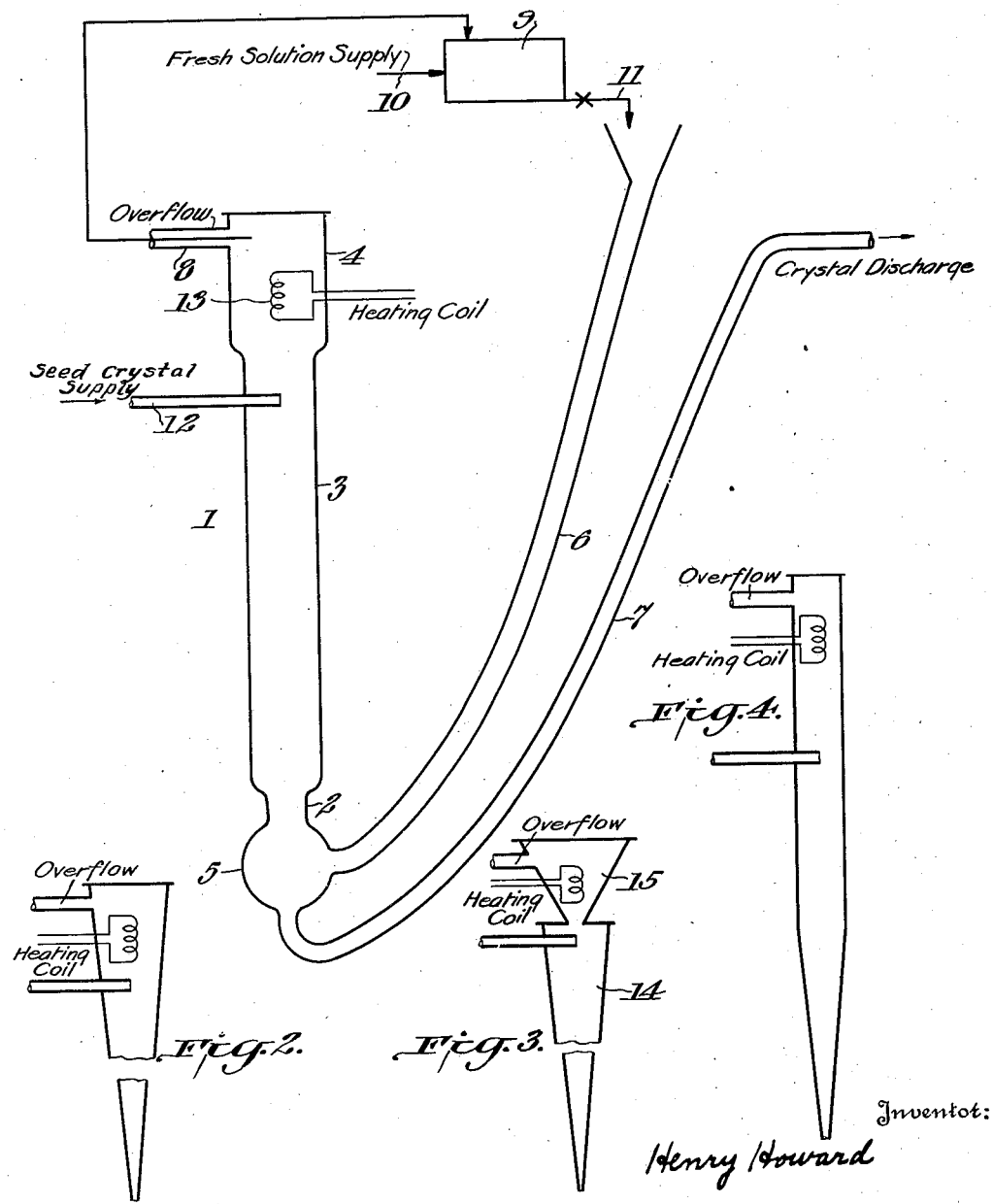

1,559,703

UNITED STATES PATENT OFFICE.

HENRY HOWARD, OF CLEVELAND, OHIO, ASSIGNOR TO THE GRASSELLI CHEMICAL COMPANY, OF CLEVELAND, OHIO, A CORPORATION OF OHIO.

PROCESS AND APPARATUS FOR CRYSTALLIZATION.

Application filed July 5, 1923. Serial No. 649,715.

*To all whom it may concern:*

Be it known that I, HENRY HOWARD, a citizen of the United States, residing at Cleveland, in the county of Cuyahoga and State of Ohio, have invented certain new and useful Improvements in Processes and Apparatus for Crystallization, of which the following is a specification.

This invention relates to process and apparatus for crystallization, and more particularly to the direct production of crystal products of substantially uniform predetermined sizes.

It has been found heretofore that crystallization may be advantageously carried out in solutions in motion and several forms of apparatus, among which may be mentioned apparatus provided with stirrers for agitating the crystallizing solution, have been designed for this purpose. It has also been proposed to cause crystallization to take place in the foaming or boiling upper layer of an upwardly flowing current of the crystallizing solution. These processes possess certain advantages, particularly with reference to the production of relatively pure fine-grained crystals and rapid crystallization.

The present invention relates to certain improvements in said prior processes and to apparatus for the carrying out of the improved process in which the valuable characteristics of the prior processes resulting from the crystallization in a solution in motion are combined with a grading or sorting action accomplished by the movement of the crystallizing solution, whereby crystal products of substantially uniform and predetermined size of crystal grain and of high purity are produced directly at an economical rate.

The invention consists generally in causing crystallization or crystal growth to take place in an upwardly flowing current of the crystallizing solution which is so handled that crystals of the desired size formed in the solution are permitted to sink down through the solution to a collecting space, while smaller crystals are maintained in suspension in the solution until they have either grown to the desired size or are dissolved in the crystallizing solution.

The process will be described more in detail in connection with apparatus suitable for carrying out the process and embodying my invention, several forms of which are illustrated in the accompanying drawings in which Fig. 1 is a vertical elevation of complete apparatus in accordance with my invention, and Figs. 2, 3 and 4 are vertical elevations of modified forms of crystallizing vessels.

Referring to Fig. 1, 1 is the crystallizing vessel which, as illustrated, comprises three cylindrical sections 2, 3 and 4 of progressively increasing diameters in an upward direction connected by sloping walls. The lower section 2 communicates with the trap 5 which has a relatively large cross-sectional area as compared with the section 2. The pipe 6 enters the side of the trap 5 for the supply of crystallizing solution, and the pipe 7 connects with the lowermost region of the trap 5 for the discharge of crystals collecting therein. The crystallizing solution after passing up through the crystallizing vessel 1 is delivered through the overflow 8 to waste or to purifying apparatus not illustrated or as is illustrated directly to the receptacle 9 where it is reconcentrated, for instance, by the addition of fresh concentrated solution delivered thereto as indicated at 10, the reconcentrated solution flowing from the vessel 9 as indicated at 11 to the solution delivery pipe 6. 12 is a pipe for the introduction into the crystallizing vessel 1 of fine crystals or supersaturated solution for forming fine crystals to be grown, and 13 is a heating coil for melting fine crystals as will be explained hereinafter.

The form of apparatus illustrated in Fig. 1 may be varied extensively without departure from the principles involved. For instance, instead of the three sections 2, 3 and 4 the crystallizing vessel may comprise a greater or less number of sections of progressively increasing cross-sectional area in an upward direction. The vessels may be square or of other desired cross-sectional shape, although for obvious reasons the circular cross section is preferred. The trap 5, illustrated as spherical, may be of any other suitable shape, for instance, rectangular or conical. The pipe 6 of course should empty into the trap 5 in such a way as not to interfere with the settling of crystals therein. For this purpose it may be advantageous to have it deliver liquid into the trap through a screen or perforated plate or against a baffle to avoid the production of strong liquid currents in the trap. The crystal discharge pipe 7 is designed to convey a slurry of the finished crystals with a sufficient current of the crystallizing solution to carry them along. The pipe 7 may be replaced by any other suitable means for the discharge of crystals such as a simple outlet or drain cock, a boot and bucket conveyor or the like.

The crystallizing vessel may take other forms as illustrated in Figs. 2, 3 and 4. Fig. 2 illustrates a simple conical vessel. It has been found in practice that the angle between the lines of intersection of the walls of the cone with a plane through the axis of the cone should be less than 60° in order to secure an efficient sorting of the crystals in this type of crystallizing vessel. A conical vessel one inch in diameter at the bottom, two inches in diameter at the top and four feet high gives satisfactory results. The conical vessel illustrated in Fig. 2 may advantageously be flared toward the top, that is, above the effective sorting zone. As is illustrated the heating coil is situated slightly below the overflow and the pipe for the introduction of supersaturated brine or seed crystals farther down in the crystallizing vessel. If the vessel is flared at the upper end as suggested, the heating coil will be placed within the flared portion and the pipe for the introduction of supersaturated brine or seed crystals at about the beginning of the flared portion.

Fig. 3 illustrates still another modification of the crystallizing vessel, comprising a lower conical section 14, the angle of which is less than 60° for the reasons stated above, and an upper communicating conical section 15, the walls of which diverge upwardly at a somewhat greater angle. The upper section 15 provides for the slow movement of the crystallizing solution therein and thus permits the sedimentation or melting or both of the fine crystals in suspension and prevents their passage through the overflow. As illustrated, the heating coil is located in the upper section 15, and the pipe for supplying seed crystals enters the crystallizing vessel near the upper end of the lower section 14.

Fig. 4 illustrates still another form of crystallizing vessel in the form of a single cylindrical vessel or pipe of relatively small diameter as compared with its height having a conical bottom of small angle, preferably less than 60°, which insures an efficient sorting or separation of the coarse from the fine crystals.

It is to be understood that the forms of apparatus illustrated are not regarded as representing every conceivable form of apparatus embodying the principles of the invention.

The operation of the process in the apparatus illustrated in Fig. 1 now to be described is analogous to the operation of the process in the apparatus illustrated in Figs. 2, 3 and 4 and will suffice to enable those skilled in the art to understand the invention.

A solution of a material to be crystallized is supplied to the vessel 9 where it is brought to the desired concentration and temperature, for instance, by distillation or by heating, if necessary and the addition of fresh concentrated or supersaturated solution as indicated at 10, and the resulting solution is delivered at 11 to the pipe 6 flowing therethrough into the trap 5. From the trap 5 a part of the solution supplied thereto flows through the pipe 7 carrying crystals from the trap to suitable means not illustrated for washing and drying them, the solution so used and separated from the crystals being returned, if desired or convenient, to the tank 9. The remainder of the solution supplied to the trap 5 flows upward successively through the sections 2, 3 and 4 to the overflow 8. The crystallizing vessel 1 serves primarily as a crystal growth and grading device and not for primary crystallization, that is, the formation of new crystals. The fine or seed crystals to be grown may be supplied to the crystallizing vessel in a variety of ways, for instance, primary crystallization in the crystallizing solution may be caused to take place by a sufficient cooling of the crystallizing solution in the crystallizing vessel. This procedure, however, is not preferred and is very difficult to control. A cooling of the whole body of the solution in the crystallizing vessel to a sufficient extent to cause primary crystallization in the case of many materials and unless the cooling is very gradual and precisely controlled is apt to result in the formation of too great a number of fine crystals, even to the extent of forming a crystal slush which interferes with or even renders impossible the desired growth of large crystals and efficient separation of the coarse crystals from the fine crystal slush. Another method of supplying fine crystals to be grown which offers more satisfactory possibilities is by local cooling of the flowing solution, for instance, by means of a small refrigerating coil, not illustrated, situated in the section 3 of the crystallizing vessel. The preferred procedures are to introduce into the crystallizing vessel through the pipe 12 a slurry of or containing fine crystals formed elsewhere or to introduce through the pipe 12 a regulated small stream of supersaturated solution of the material to be crystallized or a solution of the material of sufficient concentration and at a temperature sufficiently above that of the crystallizing solution that spontaneous primary crystallization will take place.

The relative sizes and lengths of the sections 2, 3 and 4, the rate of flow of the crystallizing solution through the sections, the temperature and concentration of the solution supplied to the crystallizing vessel and the rate of cooling of the solution in the crystallizing vessel to induce crystal growth are of course interdependent and also depend upon the size of the crystal product desired and the solubility and other characteristics of the material to be crystallized. The rate of cooling of the solution in the crystallizing vessel may, in most instances at least, be controlled satisfactorily for a given apparatus by variation of the temperature at which the solution is supplied. For instance, if slow cooling is desired, as is usually the case, the solution is supplied at only a little above atmospheric temperature, while if rapid cooling is desired a larger difference between the temperature of the solution supply and atmospheric temperature is maintained. It is of course preferred from an economic standpoint to use apparatus in which the cooling from the walls of the crystallizing vessel to the surrounding atmosphere is sufficient, but under some circumstances it may be desirable to either refrigerate the walls of the vessel or to insulate the walls to prevent too rapid cooling or even to subject the walls to a temperature above atmospheric to prevent too rapid a cooling of the crystallizing solution. It is noted in this connection that the cooling of the solution in the crystallizing vessel should not be so rapid as to produce any substantial primary crystallization, excepting as suggested above for the production of seed crystals. The rate of flow in the crystallizing vessel, and particularly through the section 2, is regulated so that only crystals of the desired maximum size are able to sink downwardly therethrough and fall into the trap 5. In the section 3 the flow of the solution is less rapid and it is in this section that the principal crystal growth takes place. The flow of solution in section 3 however is maintained sufficiently rapid to hold fine crystals in suspension but sufficiently slow to permit crystals which have reached the desired size to sink. Section 4 serves to catch and hold back from the overflow 8 the fine crystals which are carried upward by the flowing solution. Some crystal growth takes place in the section 4 and the resulting larger crystals drop into section 3 where they grow further, and the operation of the section 4 may be sufficient for this purpose or other larger sections may be placed on top of the section 4 as suggested. The preferred procedure, however, in order to avoid an undesirable multiplication of sections and also to avoid the passage of fine crystals out of the crystallizing vessel with the overflowing solution is to heat the solution by means of the heating coil 13 just before it reaches the overflow. This serves to dissolve or melt any small crystals reaching this point in the crystallizing vessel. This procedure also has the advantage that it prevents the overcharging of the crystallizing vessel with small crystals in case any primary crystallization takes place, and further, in that it raises the temperature of the crystallizing solution entirely or in part to the desired point for recirculation. The procedure has still another advantage when the process is used as it may be to produce a crystal product of uniform size from a mixture of crystals of different sizes obtained from some outside source. In this case it may be assumed that there is no solution of the material at hand and that nothing but solvent and a mixture of crystals is supplied to the crystallizing apparatus. The larger crystals in the mixture must be grown at the expense of the smaller ones. This of course is accomplished by melting the small crystals in the section 4 and then returning the resulting solution to the bottom of the crystallizing vessel where in its passage upward it serves as the medium for the growth of the larger crystals suspended therein. Even when fresh solution of the material is supplied from an outside source to provide for the growth of crystals introduced into the crystallizing vessel from an outside source the use of the heating coil 13 is ordinarily advantageous, because such a mixture of crystals ordinarily contains more fine crystals than can be grown to the desired size from the material supplied in the form of fresh solution.

The solution leaving the crystallizing vessel 1 by way of overflow 8 may be discharged to waste or conveyed to some other use or, if impure, it may be purified and delivered to the tank 9 for reconcentration, or if purification is unnecessary it may pass directly as indicated to the tank 9. In tank 9 the solution is brought to the desired initial temperature and is reconcentrated to the desired extent either by evaporation or by the addition of fresh highly concentrated solution or both and is then delivered again to the crystallizing vessel.

I have described the provision of means and procedure for preventing any fine crystals from leaving the crystallizing vessel with the overflowing solution. Some of the purposes and advantages of this procedure have also been explained. Another very important purpose served by this procedure is that the introduction of fine crystals into the trap 5 where they may settle and mix with the coarse crystal product is avoided. However, if a perfectly clean coarse crystal product is not desired the procedure for preventing the circulation of fine crystals with the solution may be omitted. It is also within the scope of my invention to remove fine crystals from the solution outside of the crystallizing vessel, for instance, by melting them in the tank 9 or by filtration or sedimentation at a suitable point in the circulation of the solution.

If it is desired to obtain more than one size of crystal product from a single apparatus it will be apparent that a trap may be placed at the base of more than one of the sections of the crystallizing vessel 1 and crystals collected and withdrawn therefrom, the size of crystals obtained from each section depending upon the rate of flow of solution in such section or upon the cross-sectional area of that section. This mode of operation and apparatus embodying the described feature are embraced by my invention, although in practice I prefer to employ either separate units of apparatus for producing crystal products of different size or to operate the same apparatus at different times with a different current flow so as to obtain the desired different sizes of crystals.

It is noted that the crystallization or growth of the crystals takes place in a free suspension of the crystals being grown in a moving solution of the crystallizing material, as a result of which the individual crystals of the crystal product are of their natural shape, being substantially unabraded by contact with other crystals or the walls of the crystallizing vessel. The free movement of the crystals in the crystallizing solution also insures an accurate grading and the maximum rate of growth.

It is noted that my process is designed primarily and preferably is carried out upon solutions at below their boiling temperatures and not upon boiling solutions or upon solutions which are supersaturated and at substantially boiling temperature.

In the appended claims the expression "supersaturated solution" is used to designate not only solutions which are supersaturated in the true sense, but also solutions containing solute in quantity greater than that necessary to produce saturation at the temperature of the crystallizing solution.

I am aware of French Patent No. 542,422.

I claim:

1. Process of crystallizing which comprises maintaining a suspension of crystals of a material to be crystallized in an ascending current of a solution of the material, inducing the deposition of material from said solution upon the crystals in suspension, and supplying crystals to be grown to said ascending current of solution by introducing a relatively small stream of a supersaturated solution of the material into said ascending current of solution.

2. Process as defined in claim 1 in which the rate of flow of the ascending current of solution throughout its entire cross section is sufficient to maintain crystals of less than a predetermined size in suspension and to permit crystals of said predetermined size to settle downwardly.

3. Process of producing a crystal product of a uniform predetermined size from a mixture of crystals of a material of different sizes which comprises suspending said mixture of crystals in an ascending current of a solution of the material of sufficient strength throughout its entire cross section to maintain crystals of less than the predetermined size in suspension and to permit crystals of said predetermined size to sink, and inducing the deposition of material from said solution upon said crystals in suspension.

4. Process of crystallizing which comprises maintaining a continuous circulation of a solution of the material to be crystallized upwardly through a crystallizing vessel and through a return circuit, maintaining crystals of the material in suspension in said solution within said crystallizing vessel, inducing the deposition of material from said solution upon said crystals in suspension and reconditioning said solution in said return circuit by the addition of fresh concentrated solution thereto.

5. Process of crystallizing as defined in claim 4 in which the strength of the current of solution in said crystallizing vessel is sufficient to maintain crystals of less than a predetermined size in suspension and to permit crystals of said predetermined size to sink.

6. Process of crystallizing as defined in claim 4 in which the strength of the current of solution in said crystallizing vessel is sufficient to maintain only crystals of less than a predetermined size in suspension and in which the solution is substantially freed of suspended crystals before leaving the crystallizing vessel by local heating thereof.

7. Process of crystallizing which comprises maintaining an ascending current of a solution of the material to be crystallized having zones of progressively decreasing rate of flow in an upward direction carrying crystals of said material in suspension, all portions of said current at any given level flowing at substantially equal rates inducing the deposition of material from said solution upon said suspended crystals, and maintaining a rate of flow of said solution through the lowermost of said zones sufficient to maintain crystals of less than a predetermined size in suspension and to permit crystals of said predetermined size to sink therethrough.

8. Apparatus for the production of crystals of uniform predetermined size comprising a crystallizing vessel enclosing a space of progressively increasing cross-sectional area in an upward direction, the average rate of said increase in cross-sectional area being less than that of a conical space the angle at the apex of which is 60°, means for supplying a solution of material to be crystallized to the lower end of said vessel, means for withdrawing mother liquor from the upper end of said vessel, and means for supplying seed crystals to the solution in said vessel.

9. Apparatus as defined in claim 8 in which the crystallizing vessel comprises a plurality of cylindrical sections of different sizes connected by upwardly diverging walls.

10. Apparatus for crystallizing comprising a crystallizing vessel, means for withdrawing liquid from the upper end of said vessel and for delivering the same to the lower end of said vessel, means for heating the solution adjacent the upper end of said vessel, means for introducing crystals of the material to be crystallized into said vessel, and means for introducing fresh solution of said material into the solution withdrawn from the upper end of said vessel.

11. Apparatus for crystallizing as defined in claim 10 in which said vessel comprises a plurality of superposed sections of progressively increasing cross-sectional area in an upward direction.

12. Apparatus for crystallizing as defined in claim 10 in which said vessel comprises a plurality of cylindrical sections of progressively increasing cross-sectional area in an upward direction.

13. Apparatus for crystallizing comprising a crystallizing vessel comprising a plurality of sections of progressively increasing cross-sectional area in an upward direction, a trap of relatively large cross-sectional area communicating with the lowermost of said sections, means for withdrawing crystals from the lowermost region of said trap, means for delivering solution of the material to be crystallized into said trap at a point above the lowermost region thereof, a heating means in the uppermost section of said vessel, means for withdrawing solution from said uppermost section and for delivering the same to said means for delivering solution of the material to be crystallized into said trap, and means for supplying fresh solution of the material to be crystallized to the solution withdrawn from said uppermost section.

In testimony whereof, I affix my signature.

HENRY HOWARD.